United States Patent [19]

Nettleton et al.

[11] Patent Number: 5,422,645

[45] Date of Patent: Jun. 6, 1995

[54] DELAYED LASER RETROREFLECTOR PULSE TECHNIQUE AND SYSTEM

[75] Inventors: John E. Nettleton, Fairfax Station; Dallas N. Barr, Woodbridge; Brian C. Redman, Alexandria, all of Va.

[73] Assignee: The United States of America as represented by the Secretary of the Army, Washington, D.C.

[21] Appl. No.: 195,065

[22] Filed: Feb. 14, 1994

[51] Int. Cl.⁶ .............................................. G01S 13/78
[52] U.S. Cl. ....................................... 342/45; 359/169
[58] Field of Search ............... 342/45, 44, 54, 5, 42; 359/170, 169, 168

[56] References Cited

U.S. PATENT DOCUMENTS 4,361,911 11/1982 Buser et al. ............................. 342/45
4,763,361 8/1988 Honeycutt et al. ..................... 342/45
5,274,379 12/1993 Carbonneau et al. ................. 342/45
5,355,241 10/1994 Kelly ....................................... 342/45

Primary Examiner—Ian J. Lobo
Attorney, Agent, or Firm—Milton W. Lee; Alain L. Bashore; Anthony T. Lane

[57] ABSTRACT

A laser interrogator system and technique establishes low-observable identification friend or foe (IFF) between two distinct positions. An interrogating laser transmits a laser pulse from a first position to a passive retroreflector fiber optic bundle located at a second position. The bundle retransmits a delayed laser retroreflector pulse. A receiver and processor at the first position processes the received retroreflected delayed laser pulse to determine a presence of a predetermined delay such that an IFF determination of the second position is achievable.

4 Claims, 5 Drawing Sheets 5,422,645

DELAYED LASER RETROREFLECTOR PULSE TECHNIQUE AND SYSTEM

BACKGROUND OF THE INVENTION

1. Field of the Invention

The present invention generally relates to laser interrogator systems and techniques for identification friend or foe (IFF) and more specifically, to a laser retroreflector pulse delay line system and technique for IFF.

2. Description of Prior Art

It is essential to positively identify friendly forces quickly, accurately and in a low observable manner with absolute assurance in order to effectively engage those unfriendly forces. The uncertainly in the identification of forces on the battlefield and subsequent hesitation in engagements can lead to an ineffective encounter, fratricide in the worst case. With the advent of increased availability of sophisticated electronics to unfriendly forces, the low observable requirement for such IFF systems and techniques to unfriendly forces become more difficult to achieve without the use of more sophisticated electronics and mechanical devices.

Currently, there is no known fielded low observable IFF system that is simple, rugged and very low cost. Several high-observable alternatives exist, such as thermal tape, near-infrared lights (NIR) lights, thermal beacons, etc. which can be viewed by all parties on the battlefield, both friendly and unfriendly. Prior art laser interrogator schemes utilize active systems which include sophisticated electronics and mechanical devices such as complex arrays of retroreflectors, mechanical or electrical driven shutter devices. Some systems depend on signal returns at some other wavelength (such as millimeter or microwave), and rely on complicated electronic processing. These systems are complicated, fragile, and very costly. Since a typical system would have to withstand tremendous impact forces during battlefield conditions, there is yet devised a practical IFF system.

While the prior art has reported using laser interrogator systems and techniques for IFF, none have established a basis for a specific technique and apparatus that is dedicated to the task of resolving the particular problem at hand. What is needed in this instance is a low observable laser interrogator system and technique that requires no mechanical moving parts or electrically powered components for the targeted platform.

SUMMARY OF THE INVENTION

It is therefore the object of the invention to provide a low observable laser interrogator system and technique that requires no mechanical moving parts or electrically powered components for the targeted platform.

According to the invention, a laser interrogator system and technique is disclosed which establishes a low-observable identification friend or foe (IFF) between two distinct positions. An interrogating laser transmits a laser pulse from a first position to a passive retroreflector means located at a second position. The passive retroreflector means retransmits a delayed laser retroreflector pulse. A receiver and processor at the first position processes the received retroreflected delayed laser pulse to determine a presence of a predetermined delay such that an IFF determination of the second position is achievable.

The passive retroreflector means in a first embodiment includes an optical fiber bundle core winding with first and second ends. Fiber optical path lengths of the core are matched to better than approximately one-tenth of a wavelength, and the second end of the core is made highly reflective. A retroreflector means such as a cube corner prism is coupled to the first end, such that a laser pulse received by the retroreflector means is transmitted along the fiber optical path length to the second end and back resulting in the retransmission of a delayed laser retroreflected pulse out of the retroreflector means. The cube corner prism is oriented such that the cube corner faces outward away from the first end of the fiber bundle. The passive retroreflector means in the second embodiment includes a focusing lens means positioned between the retroreflector means and the first end for focusing the original pulse onto one or a few fiber ends within the first end of the core. In the second embodiment the fiber optical path lengths of the core do not need to be matched to better than approximately one-tenth of a wavelength.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
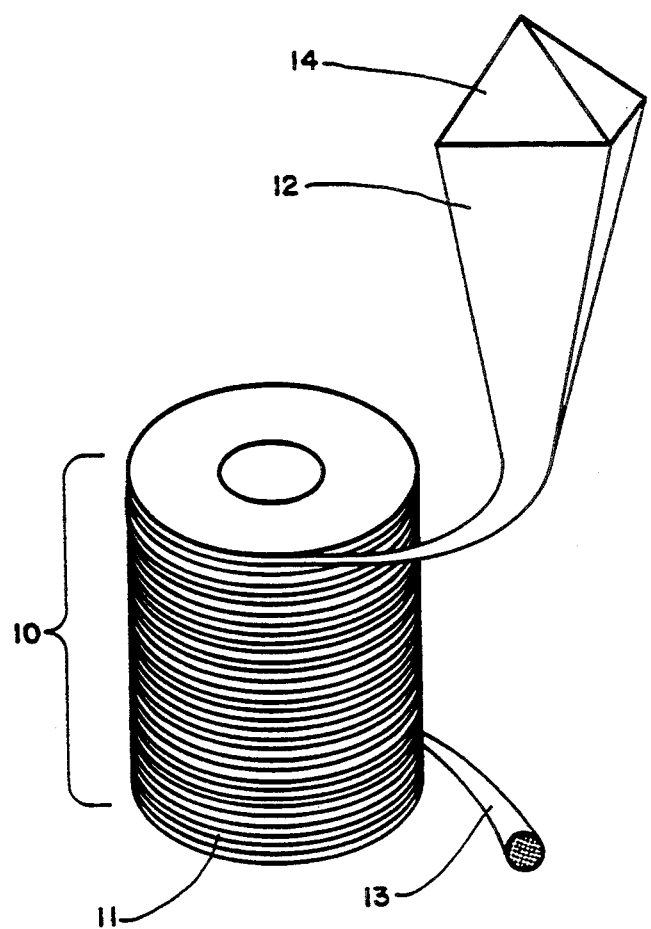
FIG. 1 is a perspective view of the first embodiment of the invention utilizing an optical fiber phased array bundle.

Referring now to the drawings, and more particularly to FIG. 1, there is shown the first embodiment of the invention utilizing optical fiber bundle core 10 which includes one or more wound narrowband optically coated windings 11 and two bundle ends 12 and 13 shown as elongated ends. In this first embodiment the single-mode fiber optic is made of silica and may be one or more strands formed into a coherent bundle. The individual single-mode fibers of core 10 is manufactured according to industry standard procedures for single-mode, round core, step-index fibers for coherent bundles. The individual fibers are then fused into the same relative positions at the bundle entrance and exit. Silica fiber coherent bundles are fused throughout the length of the bundle. The fiber optical path lengths are matched to better than about one-tenth of a wavelength in order to preserve the incident wavefront's spatial phase quality.

Elongated ends 12 and 13 are used to effect the optical fibers 11 to "remote" a high reflective mirror. End 13 is coated for high reflectivity so as to function as a remote mirror. Elongated end 13 is coated with a thin metallic film using standard optical coating processes such as chemical vapor deposition. Usually Aluminum (Al) or Silver (Ag) are used for the coatings, but other metals, such as gold, are used for applications with specific requirements such as operation in corrosive environments. End 12 is prepared by polishing end 12 flat and using an index matching adhesive for the coupling of retroreflector 14. Retroreflector 14 is a partially-transmissive/partially-reflective solid cube corner prism retroreflector. In the preferred embodiment retroreflector is a cube corner prism made of silica glass to match the fiber core refractive index in order to minimize losses. The cube corner prism is oriented such that the cube corner faces outward away from the first end of the fiber bundle.

Figure 2:
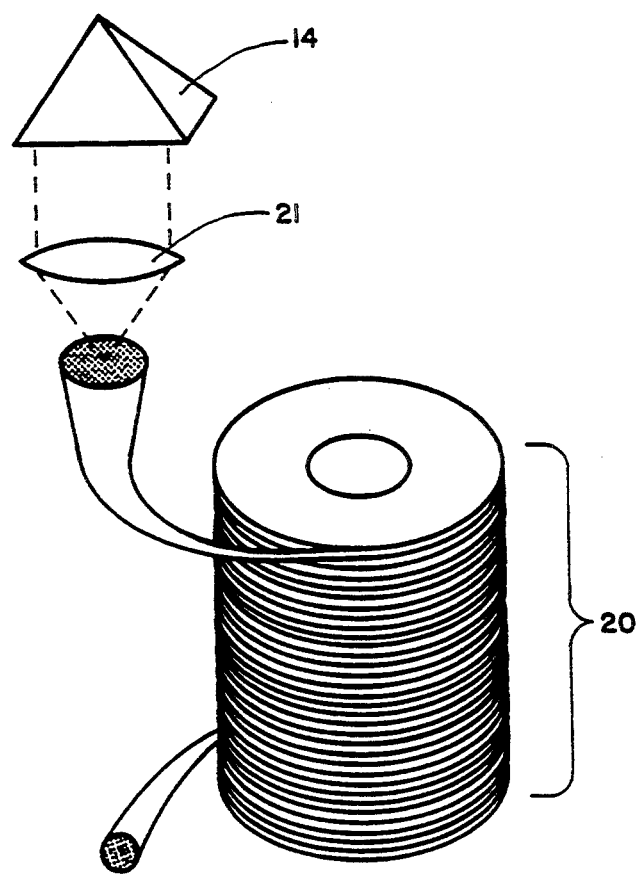
FIG. 2 is a perspective view of the second embodiment of the invention utilizing an optical fiber bundle.

FIG. 2 shows the second embodiment of the invention utilizing optical fiber phased array bundle 20. The fiber optic bundle in FIG. 2 is exactly the same as in FIG. 1, except that the lengths of the individual fibers need not be matched to within a tenth of a wavelength for FIG. 2. Length variations on the order of millimeters are tolerable for the second embodiment shown in FIG. 2. Focusing lens 21 is used in the second embodiment as means for focusing the incoming pulse onto one or a few of the fiber ends. It is understood that the invention is not limited to a specific configuration, such as the bundle core of fiber optic windings as disclosed in the first and second embodiments. Any configuration of fiber optics of a specific length that results in a retransmission of a delayed laser retroreflector pulse is sufficient to perform the function required.

Figure 3:
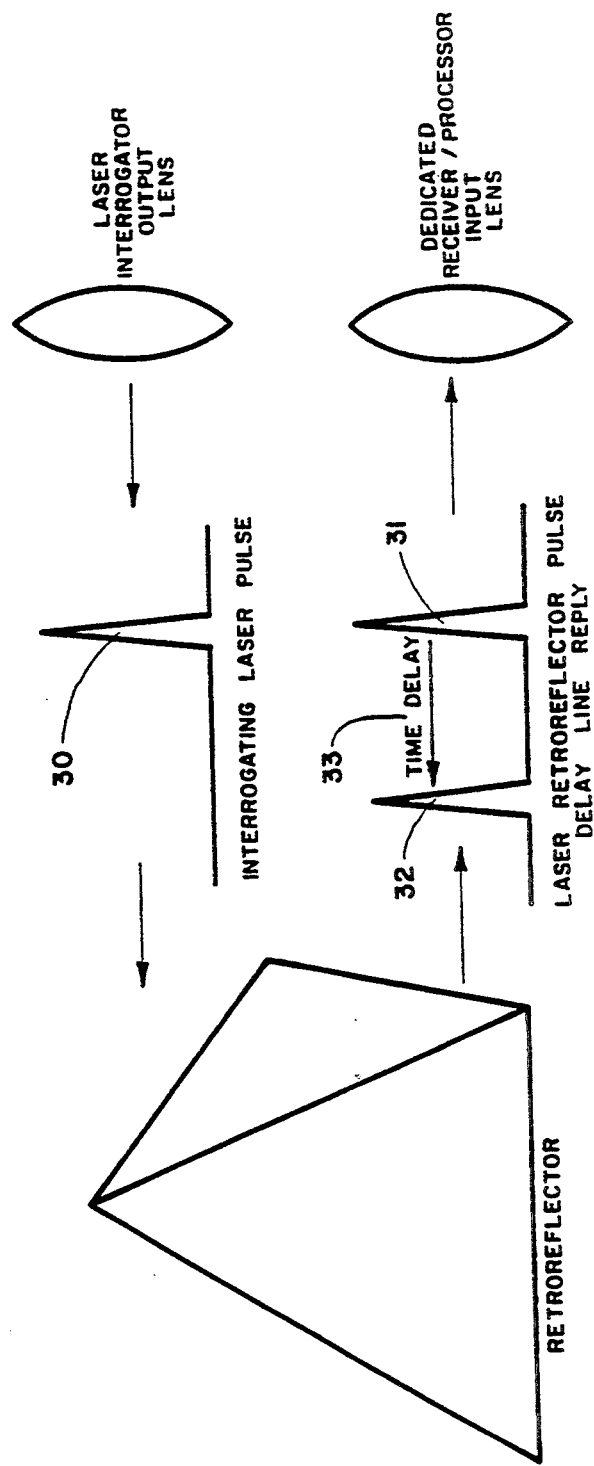
FIG. 3 is a laser pulse diagram showing the technique of the present invention.

FIG. 3 is a laser pulse diagram showing the technique utilized in the first and second embodiments of the present invention. Each retroreflector and fiber optic core will respond to an interrogated laser pulse 30 with the original pulse retroreflected and with pulses 31 and 32 that are delayed by a time delay indicated as delay 33 from the original pulse due to the remote mirror end. The length of time delay 33 is proportional to the effective length that the original pulse must travel to and back from the remote mirror end. For both embodiments, the time delay is:

$$\tau = n2L/c$$

where n is the refractive index of the core, L is the length of the fiber and c is the speed of light. For example, a 50 meter fiber with a core refractive index of 1.5 would provide a 500 nanosecond delay.

Figure 4:
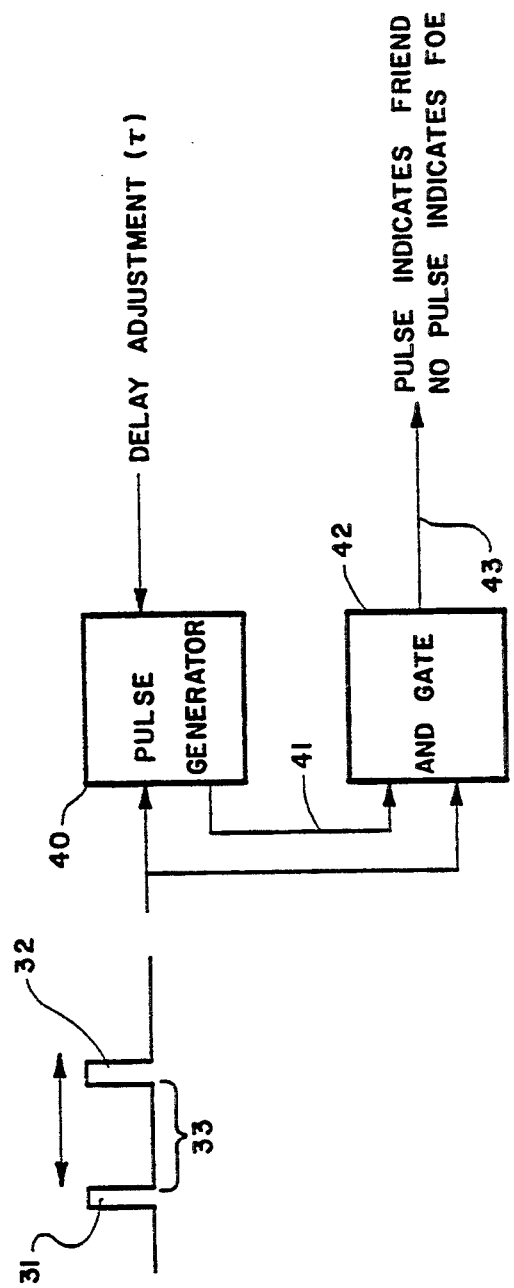
FIG. 4 is a simplified signal block diagram of the receiver/signal processor utilized with the present invention.

FIG. 4 is a simplified circuit block diagram of the receiver/signal processor utilized with the present invention. A pulse set including first and second pulses 31 and 32 with associated delay 33 of FIG. 3 is received at the laser interrogator's dedicated receiver and decoded using pulse repetition discrimination electronic processing. The rangefinder/designator receiver produces logic pulses when the returning optical pulses produce a voltage that exceeds the detection threshold. These pulses are sent to a one-shot delaying pulse generator 40. The first pulse triggers pulse generator 40 which produces a pulse 41 at time, τ. The locally produced pulse 41 and the second pulse 31 from the optical detector logic simultaneously arrive at the inputs of AND gate 42 producing a pulse 43 which indicates friend. If there is no second pulse from the optical detector logic, the AND gate 42 remains low indicating foe. The friend pulse can be used to trigger audio or optical alarms for the operator.

Figure 5:
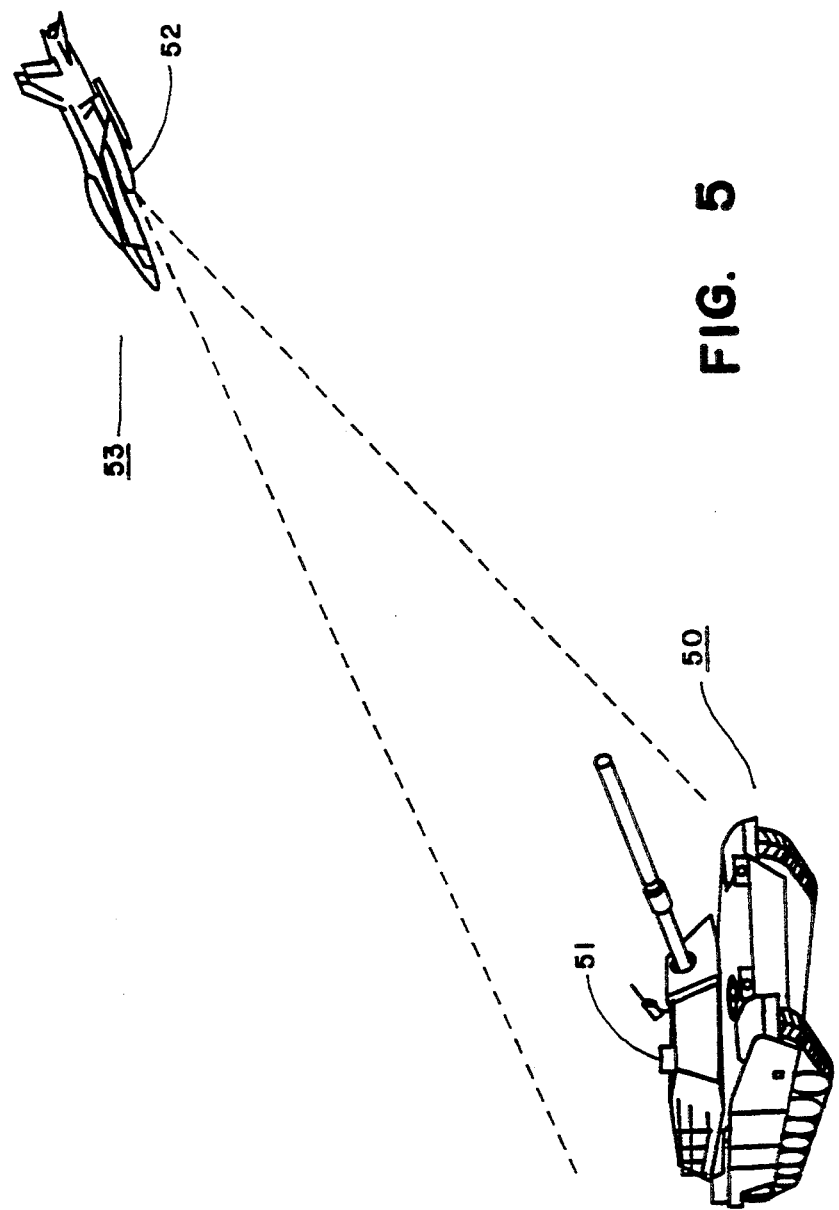
FIG. 5 shows a simplified pictorial representation of the present invention utilized in a combat environment.

FIG. 5 shows a simplified pictorial representation of the invention utilized in a combat environment. Tank 50 includes retroreflector 51 on the tank surface. Weapon platform 52 is located on aircraft 53 which includes a conventional laser designator/rangefinder with modified receiver electronics as shown in FIG. 4. Before launching a weapon, aircraft 53 fires a laser at the target to measure range or to begin designation. The receiver including retroreflector 51 will detect the multiple returns with the proper time delay and warn the pilot of a friendly target. Laser rangefinders and laser designator are standard equipment on weapon platforms. The addition of the decoding electronics to existing laser rangefinders and laser designator presents no technical problems to the system of the present invention.

While this invention has been described in terms of preferred embodiment consisting of fiber optic bundles, those skilled in the art will recognize that the invention can be practiced with modification within the spirit and scope of the appended claims.

Having thus described my invention, what We claim as new and desire to secure by Letters Patent is as follows:

1. A laser interrogator system to establish low-observable identification friend or foe (IFF) between two distinct positions including:
    an interrogating laser means for generating and transmitting a laser pulse from a first position;
    a passive retroreflector means at a second position for receiving the laser pulse transmitted from the first position and retransmitting same back to the first position;
    a passive delay means coupled to the passive retroreflector means which receives the laser pulse transmitted from the first position and delays same a predetermined period of time before being retransmitted back to the first position;
    a receiving means at the first position for receiving the delayed retroreflected laser pulse;
    a processing means at the first position for processing the received retroreflected delayed laser pulse to determine the presence or absence of a predetermined delay such that an IFF determination of the second position is achievable.

2. The laser integrator system of claim 1 wherein the passive delay means further includes:
    an optical fiber bundle core winding with first and second ends, where fiber optical path lengths of the core are matched to better than approximately one-tenth of a wavelength, and the second end of the core is made highly reflective.

3. The laser integrator system of claim 1 wherein the passive delay means further includes:
    an optical fiber bundle core winding with first and second ends, where the second end of the core is made highly reflective;
    a focusing lens means positioned between the passive retroreflector means and the first end for focusing the original pulse onto one or a few fiber ends within the first end of the core.

4. A laser interrogator technique to establish low-observable identification friend or foe between two distinct positions including the steps of:
    generating a laser pulse from a first position;
    transmitting the laser pulse from the first position to a second position;
    receiving the laser pulse at the second position;
    passively producing a time delay in the laser pulse;
    retransmitting the delayed laser pulse from the second position to the first position;
    receiving the retransmitted delayed laser pulse at the first position;
    processing the received retransmitted delayed laser pulse at the first position to determine the presence or absence of a predetermined delay such that an IFF determination of the second position is achievable.

* * * * *